United States Patent [19]
Hofmann

[11] Patent Number: 5,432,138
[45] Date of Patent: Jul. 11, 1995

[54] PROCESS FOR MANUFACTURING A LITHIUM ALUMINATE MATRIX LAYER FOR A MOLTEN CARBONATE FUEL CELL

[75] Inventor: Hans Hofmann, Mühlheim, Germany

[73] Assignee: Deutsche Aerospace AG, Germany

[21] Appl. No.: 151,877

[22] Filed: Nov. 15, 1993

[30] Foreign Application Priority Data

Nov. 13, 1992 [DE] Germany ............. 42 38 292.0

[51] Int. Cl.$^6$ ............................................. H01M 8/14
[52] U.S. Cl. ....................................... 501/153; 429/46
[58] Field of Search ................. 423/600; 501/153; 429/46

[56] References Cited

U.S. PATENT DOCUMENTS

| | | | |
|---|---|---|---|
| 4,411,968 | 10/1983 | Reiser et al. | 429/41 |
| 4,526,845 | 7/1985 | Reiser et al. | 429/46 X |
| 4,704,266 | 11/1987 | Kadokura et al. | 423/600 |
| 5,217,702 | 6/1993 | Frianeza-Kullberg | 423/600 |

FOREIGN PATENT DOCUMENTS

| | | |
|---|---|---|
| 3235420 | 4/1983 | Germany. |
| 3235421 | 4/1983 | Germany. |
| 4030945 | 4/1992 | Germany. |

Primary Examiner—Stephen Kalafut
Attorney, Agent, or Firm—Evenson, McKeown, Edwards & Lenahan

[57] ABSTRACT

A gamma lithium aluminate matrix layer for a molten carbonate fuel cell is manufactured using a slurry whose liquid phase is formed by an aqueous polyvinyl alcohol solution.

20 Claims, 1 Drawing Sheet

PROCESS FOR MANUFACTURING A LITHIUM ALUMINATE MATRIX LAYER FOR A MOLTEN CARBONATE FUEL CELL

BACKGROUND AND SUMMARY OF THE INVENTION

The present invention relates to a process for manufacturing a lithium aluminate matrix layer for a molten carbonate fuel cell, and more particularly, to such a process in which a wet film is formed in a slurry of gamma aluminate particles.

A melted carbonate fuel cell (MCFC) consists of a stack of bipolar plates each of which consists of a matrix layer provided on one side with an anode layer and on the other side with a cathode layer. The anode layer can be a porous nickel layer, and the cathode layer can be a porous nickel oxide layer. The matrix layer forms a membrane between the two electrode layers and consists for example of gamma lithium aluminate. The matrix layer contains the electrolyte which is usually composed of a mixture of lithium carbonate and sodium carbonate. The operating temperature of such a fuel cell is generally between 600° and 700° C.

It was known to use a slurry to make the matrix layer of gamma lithium aluminate, whose liquid phase is composed of organic solvents, for example a mixture of cyclohexane, ethyl methyl ketone and fish oil.

According to DE 32 35 240 C2 and DE 32 35 241 C2, matrix layers for melted carbonate fuel cells are made of gamma lithium aluminate, aluminum oxide as a tear stopper and polyvinyl butyral. These components are reacted with an organic solvent, preferably with perchloroethylene and isobutanol, and fish oil, in order to form a suspension which is stretched to form a wet film and then dried.

It is known from DE 40 30 945 A1 to form the matrix layer of a molten carbonate cell by rolling out a mass of aluminum oxide and zirconium oxide with polyvinyl alcohol and water to form a film which, after drying, is brought into contact with the lithium carbonate-containing melt, whereupon the aluminum oxide is converted into lithium aluminate and the zirconium oxide into lithium zirconate.

As indicated in the journal "Fuel Cell," December 1990, pages 1 to 6, this known process must exclude moisture. Water results in hydrolysis of the gamma lithium aluminate into lithium hydroxide and aluminum hydroxide. Although lithium aluminate is formed again upon drying, it is not the gamma phase or the gamma crystal modification but the alpha or beta phase. In contrast to the gamma phase which is stable at the operating temperature of the fuel cell, the alpha or beta phase changes to the gamma phase during operation of the fuel cell, with a change in volume of the matrix which can result in an adverse effect upon the function of the fuel cell, e.g. as a result of settling tears in the electrolyte-conducting matrix as well as stresses and warping of the cell stack.

The use of organic solvents to form a slurry involves a number of disadvantages. Thus, for example, working with solvents requires appropriate protective measures to avoid risks to health and to avoid explosions. In addition the slurry must be pulled immediately to form films. If the slurry formulation is left standing, a skin often forms after only a few seconds, since the organic solvent at the surface of the slurry formulation evaporates. After such a skin has formed, the formulation cannot be used any longer, however, because when the film is drawn, striated traces of pulling by parts of the skin may form.

To eliminate gas inclusions in the slurry which would lead to undesirably large pores in the matrix, the known method degasses the slurry after drawing, in other words as a wet film. Since this has to be done very slowly, only a low pulling speed can be used.

A goal of the present invention is to simplify the known method for manufacturing a gamma lithium aluminate matrix for a molten carbonate fuel cell in such fashion that despite the tendency of the gamma lithium aluminate toward hydrolysis, it is no longer necessary to work with strict exclusion of moisture.

The foregoing object has been accomplished according to the present invention by a process in which the liquid phase of the slurry is formed by an aqueous polyvinyl alcohol solution. Surprisingly, this does not produce any hydrolysis of the gamma lithium aluminate particles in the slurry, and thereby avoids lithium aluminate of the alpha or beta crystal modification, which changes during operation of the fuel cell into gamma lithium aluminate, involving a change in volume.

A basic concept of the present invention, therefore, is to bond the water molecules of the slurry at least to the extent that they are no longer available for hydrolysis of the gamma lithium aluminate particles. Polyvinyl alcohol possesses this ability because of its hydroxyl groups. It is able to bind water molecules in large quantities sufficiently strongly.

Therefore, the slurry can be manufactured using the method according to the present invention without organic solvents. The process according to the invention is also characterized by a high degree of environmental compatibility. Thus an aqueous polyvinyl solution can be disposed of or dumped safely with no resulting problems into a community sewage treatment plant. Furthermore, no expensive special waste disposal is required.

The slurry made according to the present invention also has a pot life of several hours which means that skin formation does not occur even after several hours. Consequently, the pulling of the film or other film manufacturing process need not be performed immediately after the slurry has been made, thereby considerably simplifying the task.

An important advantage of the process according to the present invention also consists in the fact that the slurry, since it does not have a tendency to form a skin, can be degassed before the film is formed therefrom. In other words, the slurry formulation can be degassed by, for example, applying a vacuum or being subjected to falling-film degassing. Degassing can thus be performed relatively quickly. Since the slurry is already degassed when the film is made, a high film manufacturing speed as well as a film pulling speed of, for example, 2 to 10 m/min. can be used as well.

The wet film is dried in air after being produced and, when provided with the two electrode layers, can be incorporated in the fuel cell. If it has not been so incorporated after several days, it is advantageous to store the film in a drying cabinet after drying.

The process according to the invention is, therefore, characterized by high environmental compatibility and simplicity of working with the slurry. Manufacture of the wet film can proceed in the method according to the invention by using a film puller. The wet film can, however, be manufactured in a different way (e.g. with a pressure method such as screen printing) by calendaring or pouring.

In particular, when an acrylate glass plate is used as a substrate, the film can be easily removed from the substrate after drying in air. This constitutes another advantage over the known process with a slurry with an organic solvent, in which a separating film must be provided between the wet film and the substrate.

A tear stopper can also be added to the slurry. Aluminum oxide (corundum) can be used for example as a tear stopper with an average particle size of 3 to 30 $\mu$. The percentage of aluminum oxide particles based on the total weight of gamma lithium aluminate and aluminum oxide is advantageously less than 20%.

The amount of polyvinyl alcohol in the liquid, in other words, aqueous phase of the slurry is generally 3 to 20 wt. % based on the liquid phase, and preferably 5 to 12 wt. %. Preferably a polyvinyl alcohol with an average degree of polymerization of approximately 300 to 6,000, preferably approximately 1,000 to 4,000, can be used as the polyvinyl alcohol, corresponding to an average molecular weight of approximately 20,000 to 300,000, preferably approximately 50,000 to 200,000, respectively.

The degree of hydrolysis of the polyvinyl alcohol can fluctuate between, for example, 20 and 100 mole %. In the form of a 4 wt. % aqueous solution, the polyvinyl alcohol preferably used has a viscosity of 4 to 70, preferably 10 to 40 mPas$^2$.

The gamma lithium aluminate used to form the slurry preferably has an average particle size of less than 3 $\mu$, preferably less than 2 $\mu$. The weight ratio of the gamma lithium aluminate to the polyvinyl alcohol-containing aqueous phase of the slurry is preferably 3:1 to 1:3. The weight ratio depends, in particular, upon the particle size of the gamma lithium aluminate. In other words, the finer the gamma lithium aluminate, the more fluid is required for slurry formation. Preferably the slurry has a viscosity range from approximately 1.5 to 10 cP.

BRIEF DESCRIPTION OF THE DRAWINGS

These and further objects, features and advantages of the present invention will become more readily apparent from the following example when taken in conjunction with the accompanying drawings wherein.

DETAILED DESCRIPTION OF THE INVENTION

Ninety parts by weight of gamma lithium aluminate with an average particle size of 1 $\mu$ and 10 parts by weight of aluminum oxide with an average particle size of 5 $\mu$ are reacted with 100 parts by weight of a 10% aqueous polyvinyl alcohol solution. Mowiol ® 26–88 is used as the polyvinyl alcohol. The mixture is stirred to form a homogeneous slurry. The slurry is then completely degassed in a vacuum of 8 mbar in a few minutes, whereupon it is poured into a film puller in order to form a film with a wet layer thickness of about 1 mm. The film pulling speed is about 5 m/min. An acrylate resin plate is used as the substrate. The wet film is removed from the acrylate resin plate after drying in air.

Figure 1:
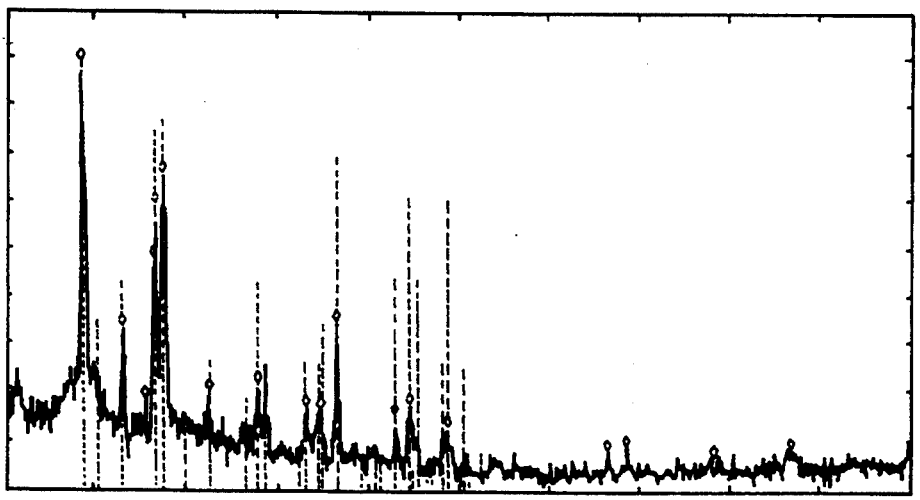
FIGS. 1 and 2 are X-ray structure spectra of the sample before and after burning.
Figure 2:
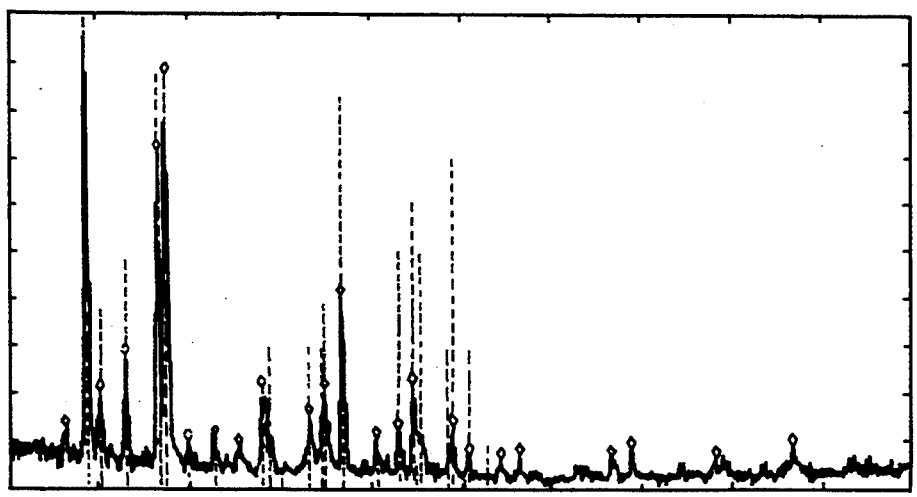
Figure 3:
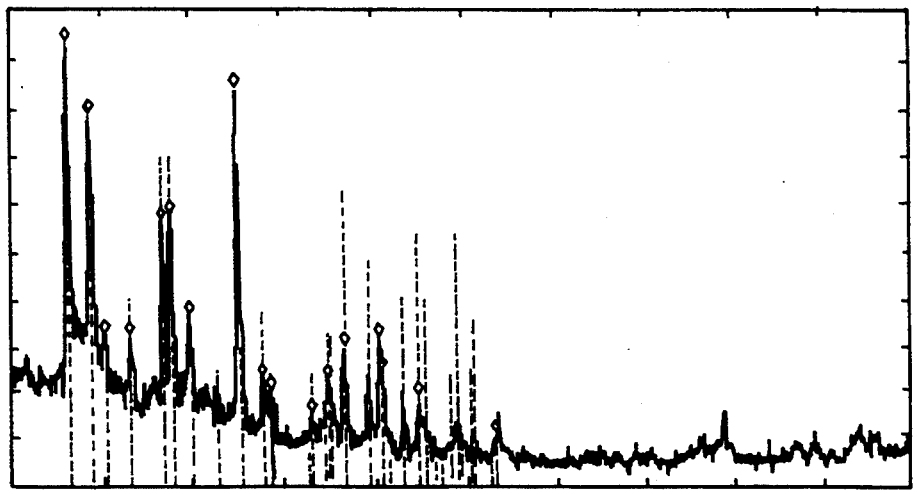
FIG. 3 is an X-ray spectrum of a mixture of gamma and alpha lithium aluminate.

An x-ray structural analysis is performed with a sample of the film that has been subjected to a burning process. The x-ray structure spectrum of the sample before burning is shown in FIG. 1 and after burning in FIG. 2 of the attached drawings. According to ASTM File 18-0714, this is gamma lithium aluminate. In comparison, FIG. 3 of the drawing shows the x-ray structural spectrum of a mixture of gamma and alpha lithium aluminate. The alpha lithium aluminate was determined using ASTM File 19-0713. This mixture was subjected to the same burning process. It is evident that the peaks typical of alpha lithium aluminate do not occur in the film sample manufactured according to the invention.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for manufacturing a lithium aluminate matrix layer for a molten carbonate fuel cell, comprising the steps of forming a wet film from a slurry of gamma lithium aluminate particles with a liquid phase of the slurry being formed by an aqueous polyvinyl alcohol solution, and drying the film to produce the lithium aluminate matrix layer.

2. The process according to claim 1, wherein a polyvinyl alcohol concentration of 3 to 20 wt. % is used in the liquid phase.

3. The process according to claim 1, wherein the polyvinyl alcohol solution is a 4 wt. % solution with a viscosity of 4 to 70 mPas.

4. The process according to claim 3, wherein a polyvinyl alcohol concentration of 3 to 20 wt. % is used in the liquid phase.

5. The process according to claim 1, wherein the polyvinyl alcohol solution has a degree of hydrolysis exceeding 70 mole % and an average degree of polymerization of 300 to 6,000.

6. The process according to claim 5, wherein a polyvinyl alcohol concentration of 3 to 20 wt. % is used in the liquid phase.

7. The process according to claim 6, wherein the polyvinyl alcohol solution is a 4 wt. % solution with a viscosity of 4 to 70 mPas.

8. The process according to claim 1, wherein the gamma lithium aluminate particles have an adjusted weight ratio to the liquid phase in the slurry of between about 3:1 to 1:3.

9. The process according to claim 8, wherein a polyvinyl alcohol concentration of 3 to 20 wt. % is used in the liquid phase.

10. The process according to claim 9, wherein the polyvinyl alcohol solution is a 4 wt. % solution with a viscosity of 4 to 70 mPas.

11. The process according to claim 10, wherein the polyvinyl alcohol solution has a degree of hydrolysis exceeding 70 mole % and an average degree of polymerization of 300 to 6,000.

12. The process according to claim 1, wherein the gamma lithium aluminate particles have an average particle size of less than 3 $\mu$m.

13. The process according to claim 1, further comprising the step of adding a tear stopper to the slurry.

14. The process according to claim 13, wherein the tear stopper comprises aluminum oxide with an average particle size of less than 30 $\mu$m.

15. The process according to claim 1, further comprising the step of degassing the slurry before the wet film is formed.

16. The process according to claim 9, wherein slurry is degassed by at least one of a vacuum and to falling-film degassing.

17. The process according to claim 16, wherein a polyvinyl alcohol concentration of 3 to 20 wt. % is used in the liquid phase.

18. The process according to claim 17, wherein the polyvinyl alcohol solution is a 4 wt. % solution with a viscosity of 4 to 70 mPas.

19. The process according to claim 18, wherein the polyvinyl alcohol solution has a degree of hydrolysis exceeding 70 mole % and an average degree of polymerization of 300 to 6,000.

20. The process according to claim 19, wherein the gamma lithium aluminate particles have an adjusted weight ratio to the liquid phase in the slurry of between about 3:1 to 1:3.

* * * * *